United States Patent
Burdick

[11] 3,756,342
[45] Sept. 4, 1973

[54] REPLACEABLE AIR CUSHION DEVICE

[75] Inventor: Robert E. Burdick, Santa Barbara, Calif.

[73] Assignee: Rolair Systems, Inc., Santa Barbara, Calif.

[22] Filed: Sept. 15, 1971

[21] Appl. No.: 180,666

[52] U.S. Cl................. 180/124, 180/125, 180/126, 180/128, 180/129
[51] Int. Cl............................................. B60v 1/02
[58] Field of Search.................... 180/124, 125, 127, 180/128, 116, 117, 118, 119, 120, 121, 122

[56] References Cited
UNITED STATES PATENTS

| | | | |
|---|---|---|---|
| 3,276,530 | 10/1966 | Borneman............................ | 180/124 |
| 2,790,196 | 4/1957 | Rideout et al........................... | 16/30 |
| 3,260,322 | 7/1966 | Mackie................................ | 180/124 |
| 2,782,045 | 2/1957 | Hulbert................................ | 16/30 X |
| 3,318,406 | 5/1967 | Scheel................................ | 180/124 X |

FOREIGN PATENTS OR APPLICATIONS 1,012,812  12/1965  Great Britain...................... 180/116

*Primary Examiner*—Kenneth H. Betts
*Assistant Examiner*—John P. Silverstrim
*Attorney*—Harris, Kern, Wallace & Tinsley

[57] ABSTRACT

An air cushion load carrying device having one or more air bearings and providing for removal and replacement of an air bearing while the load carrying structure continues to support the load. A load carrying member with a slide in and slide out construction for individual air bearings. A load carrying member with an air distribution chamber and receptacles for one or more air bearings and air flow paths between the chamber and the bearings with a pressure seal construction providing ready insertion and removal of bearings.

4 Claims, 5 Drawing Figures

PATENTED SEP 4 1973　　3,756,342

REPLACEABLE AIR CUSHION DEVICE

This invention relates to compliant air bearing devices such as those used for transporting heavy loads in factories and the like. Air bearings or air cushion devices are widely used for a variety of purposes today. A typical air cushion device has a load carrying member with a rigid support or hard points for resting on the floor, one or more air bearings of generally circular or racetrack configuration, and a source of air under pressure for feeding to the diaphragms of the air bearing.

The air expands the diaphragm and raises the hard points from the floor. Air flows outward between the diaphragm and the floor, providing a film of air which serves as a lubricant and permits easy movement of the loaded device over the floor. A variety of configurations for the air bearing and for the load carrying member are in use for moving loads of all types ranging from small boxes to houses and airplanes.

The air bearing is at the bottom of the air cushion device and is not readily accessible for inspection and/or replacement. The conventional procedure is to unload the device and invert the unit for carrying out work on the air bearing. This creates a problem in many instances, particularly where the load is extremely heavy and where the load carrying member also serves as the normal cradle or support for the load. It is an object of the present invention to provide a new and improved air cushion device which permits removal and insertion of an individual air bearing while the air cushion device is fully loaded. A further object is to provide such a device wherein the individual air bearing is slidably inserted and removed from the side or end so that the load is not disturbed in anyway. An additional object is to provide such a device permitting removal and replacement of an individual air bearing without requiring disconnecting and reconnecting of plumbing.

Other objects, advantages, features and results will more fully appear in the course of the following description. The drawing merely shows and the description merely describes a preferred embodiment of the present invention which is given by way of illustration or example.

Figure 1:
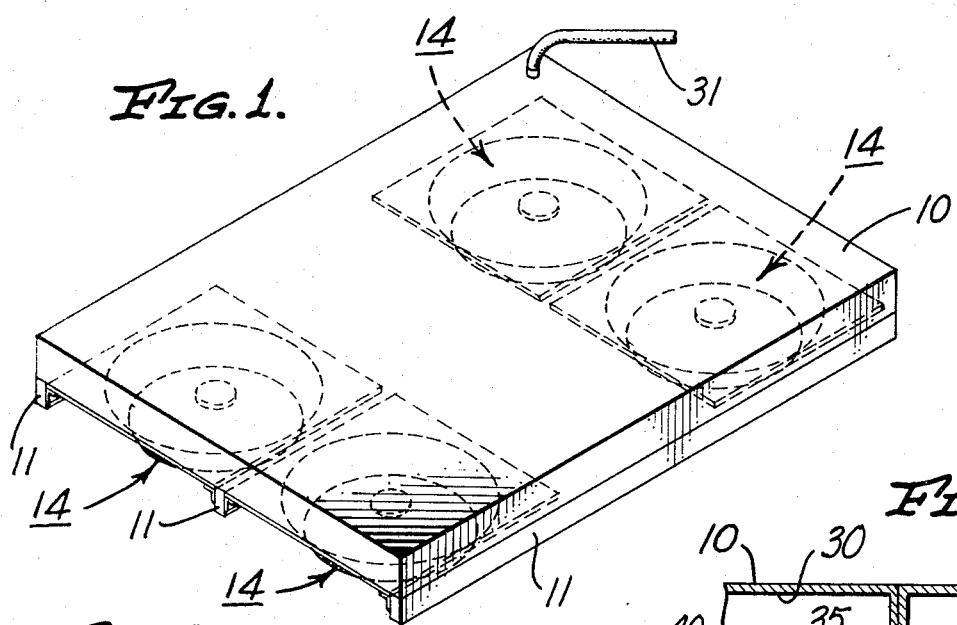
FIG. 1 is a perspective view of an air cushion device incorporating a preferred embodiment of the present invention.

The air cushion device includes a load carrying member 10 which may have any configuration and is shown in FIG. 1 as a conventional flat platform. Ribs 11 are carried on the underside of the platform 10 and serve as support means or hard points for resting on the floor or other surface 12 when the air bearings are deflated.

One or more air bearings 14 are incorporated in the air cushion device, and four air bearings are utilized in the device of FIG. 1. Various forms of air bearings are known and may be used in the present device and a typical air bearing is illustrated in the drawing. A diaphragm 15 is fixed to a plate 16 at the periphery 17 and at the center 18, typically with a clamp ring 19 and a clamp plate 20. Air flow is provided between an annular zone 25 and a center zone 26 by openings 27 in the diaphragm.

Figure 3:
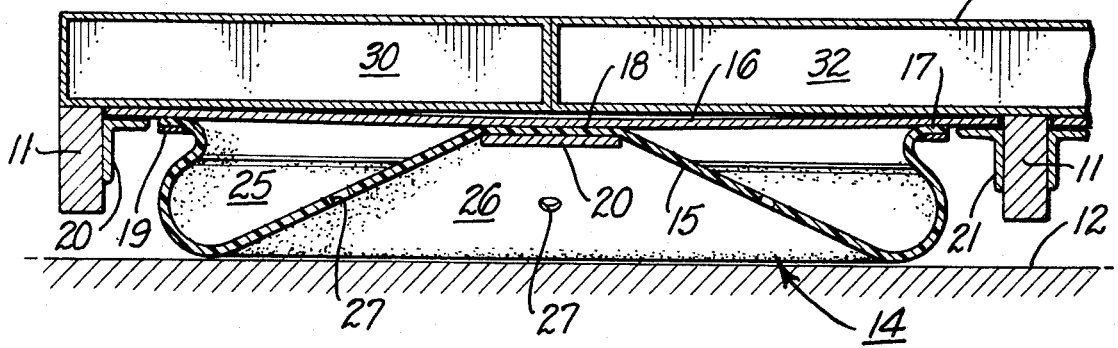
FIG. 3 is an enlarged sectional view taken along the line 3—3 of FIG. 2.

The platform 10 incorporates a slide in receptacle for each of the air bearings 14. Referring to FIG. 3, brackets 20, 21 may be carried on the ribs 11, with the horizontal portions of the brackets serving as rails and defining slots between the brackets and the platform for sliding insertion and removal of the plate 16 of the air bearing. A stop bracket 22 may be carried on the under side of the platform 10 for engaging the plate 16 and limiting the insertion of the plate into the receptacle.

The load member or platform 10 includes an air chamber 30 and means for supplying air under pressure to the chamber. An air compressor may be installed directly on the platform or the air may be provided from a remote source via a hose line 31. A separate damping chamber 32 may be provided in the platform 10 if desired. An air inlet opening 33 is provided in the plate 16 of the air bearing. A damping opening 34 may also be provided in the plate 16 if desired. An air outlet opening 35 in the platform provides communication between the air chamber 30 and the air bearing when the bearing is inserted in the receptacle of the platform. Another damping opening 36 may be provided for communication between the damping chamber 32 and the air bearing.

A gasket 40 may be installed between the air bearing plate 16 and the bottom of the platform 10 at the openings 33, 35. A similar gasket 41 may be installed at the openings 34, 36. Conventional gasket material may be utilized and the gaskets may be attached to the plate 16 or the platform 10 by cementing as desired. The gaskets may be made of any spongy elastomer (including foam) and adhesion may be by pressure sensitive adhesive on one side of the gasket material.

Figure 4:
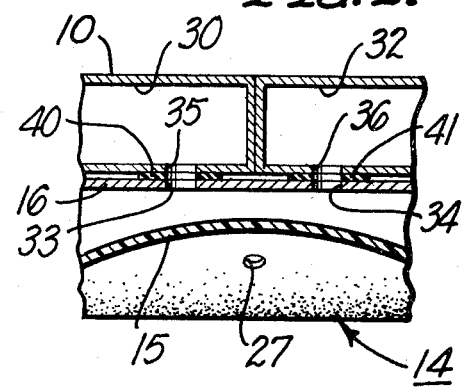
FIG. 4 is an enlarged sectional view taken along the line 4—4 of FIG. 2.
Figure 2:
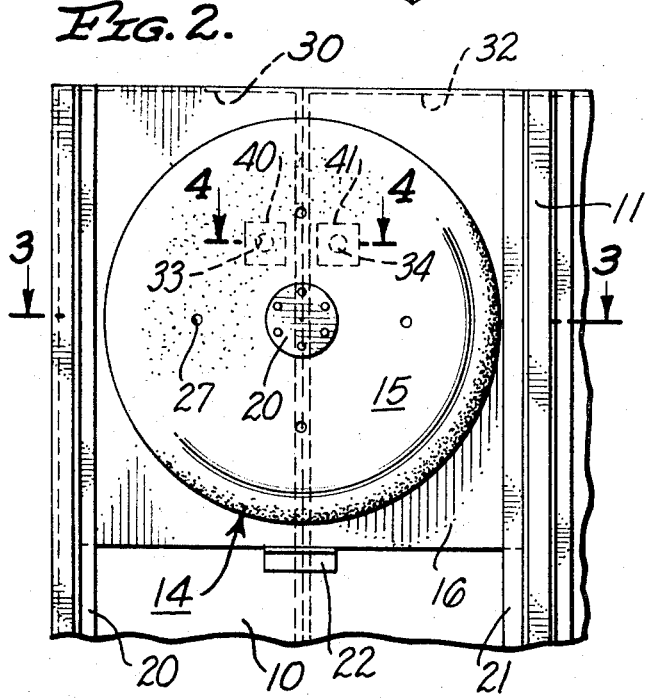
FIG. 2 is an enlarged bottom view of a portion of the device of FIG. 1.
Figure 5:
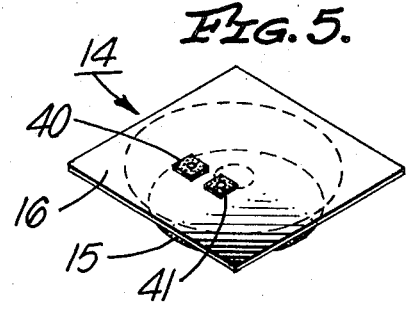
FIG. 5 is a view similar to that of FIG. 1 showing an individual air bearing.

With the air supply off, the platform 10 will be supported by the ribs 11 which rest on the floor 12. The diaphragms of the air bearings are not inflated. The plate 16 which typically is made of aluminum or steel will be slightly deformed by the gaskets 40, 41 as seen in FIG. 4 and the stressing of the plate will tend to compress the gaskets providing a seal.

When the air supply is turned on, air under pressure will be introduced into the air chamber 30 and through the openings 35, 33 to the annular zone 25 of the diaphragm. Air will also flow through the openings 34, 36 into the damping chamber 32 which serves to dampen or smooth out surges in air pressure. Appropriate chamber interconnections can be provided in the platform 10 to feed air to each of the air bearings and to connect each of the air bearings with the damping chamber.

Introduction of air under pressure into the annular zone 25 expands the diaphragm downward and outward and lifts the platform and its load upward, raising the ribs 11 from the surface 12. Air flows through the openings 27 to the inner zone 26 and thence outward between the diaphragm and the floor providing an air film with low resistance to horizontal movement, permitting movement of the platform and its load. Since the load is now supported on the air bearing, additional pressure is thereby applied to the seals 40, 41 resulting in very effective seals at the openings 33–36.

An air bearing is readily removed for inspection and/or replacement. The air supply is shut off and as the air exhausts from the chambers and diaphragm, the diaphragm collapses and the platform settles onto the ribs 11. The air bearing which is now unloaded may be slid laterally out of the receptacle. Movement of the air bearing may be facilitated by inserting a screw driver or pry bar between the air bearing plate and the bottom of the platform to slightly spread the two parts and relieve the load on the gaskets.

With this arrangement, one or more of the air bearings may be removed and replaced without disturbing the load on the platform. Air bearing maintenance can be carried out while other work is performed on the load and the air cushion device need never be out of service.

An air bearing is inserted in the same manner, preferably by using the screw driver or pry bar to elastically deform the plate 16 to prevent a compressive load on the gaskets and facilitate sliding insertion of the plate in the slot. When fully inserted the screw driver or pry bar is removed, thereby allowing the plate 16 to spring upward and compress the gasket against the platform 10 creating the seal. With this construction, the air bearing is not crushed nor is the air bearing diaphragm trapped when there is a load on the load carrying member.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. A replaceable air cushion device including in combination:
   a load carrying member having
   support means for resting on surface and supporting said load carrying member in a horizontal position,
   guide means defining a horizontally disposed receptacle with a top wall, and
   an air chamber with an outlet opening at said top wall;
   an air bearing having
   a plate for sliding laterally into and out of said receptacle when said load carrying member is supported by said support means with and without a load, and
   a diaphragm carried on and depending from said plate defining an annular air zone between said plate and diaphragm, and an inner air zone within said annular zone, with at least one opening in said diaphragm providing for air flow between said zones,
   said plate having an inlet opening providing for air flow from said air chamber through said outlet and inlet openings to said zones when said air bearing plate is slid into said receptacle;
   means for delivering air under pressure to said air chamber for air flow into said annular zone to urge said diaphragm downward and raise said support means up from the surface for lateral movement of said load carrying member, with said air bearing being laterally slideable out of and into said receptacle when said diaphragm is exhausted for replacing air bearings with and without a load; and
   a seal gasket between said wall outlet opening and plate inlet opening, with said gasket being compressed in sealing relation between said wall and plate when air under pressure is delivered to said annular zone raising said support means from the surface.

2. A device as defined in claim 1 wherein said load carrying member includes a damping chamber with a first damping opening at said top wall, and
   said air bearing includes a second damping opening in said plate, with said damping openings aligned providing air flow between said damping chamber and said zones when said outlet and inlet openings are aligned.

3. A device as defined in claim 2 including and a second seal gasket between said first and second damping openings, with said gaskets being compressed in sealing relation between said wall and plate when air under pressure is delivered to said annular zone raising said support means from the surface.

4. A replaceable air cushion device including in combination:
   a load carrying member having
   support means for resting on a surface and supporting said load carrying member in a horizontal position,
   guide means defining a plurality of horizontally disposed receptacles with a top wall, and
   an air chamber with an outlet opening for each receptacle at said top wall;
   a plurality of air bearings, each having
   a plate for sliding laterally into and out of a receptacle when said load carrying member is supported by said support means with and without a load, and
   a diaphragm carried on and depending from said plate defining an annular air zone between said plate and diaphragm, and an inner air zone within said annular zone, with at least one opening in said diaphragm providing for air flow between said zones,
   said plate having an inlet opening for air flow from said air chamber through outlet and inlet openings to said zones when an air bearing plate is slid into a receptacle;
   means for delivering air under pressure to said air chamber for air flow into said annular zones of each of said air bearings to urge the diaphragms downward and raise the support means up from the surface for lateral movement of said load carrying member, with said air bearings being laterally slideable out of and into the respective receptacles when the diaphragms are exhausted for replacing air bearings with and without a load; and
   a seal gasket between each wall outlet opening and the corresponding inlet opening, with each gasket being compressed in sealing relation between the wall and plate when air under pressure is delivered to the annular zone raising said support means from the surface.

* * * * *